United States Patent

Kuznetz

[11] Patent Number: 4,648,130
[45] Date of Patent: Mar. 3, 1987

[54] RADIO-THERMAL HEADBAND

[76] Inventor: Lawrence Kuznetz, Apt. #7K, 300 Central Park West, New York, N.Y. 10024

[21] Appl. No.: 774,744

[22] Filed: Sep. 11, 1985

[51] Int. Cl.$^4$ ............................ H04B 1/08; A42B 1/00
[52] U.S. Cl. ..................................... 455/351; 455/100; 2/7
[58] Field of Search .................. 455/89, 100, 347, 351; 2/7, 177; 343/702

[56] References Cited

U.S. PATENT DOCUMENTS

| | | | |
|---|---|---|---|
| 2,678,999 | 5/1954 | Norris | 455/351 |
| 3,089,145 | 5/1963 | Kiefer | 2/177 |
| 3,254,444 | 6/1966 | Paterson | 455/351 |
| 3,977,003 | 8/1976 | Kershaw | 343/702 |
| 4,277,847 | 7/1981 | Florio | 2/12 |
| 4,340,972 | 7/1982 | Heist | 455/100 |
| 4,483,021 | 11/1984 | McCall | 2/7 |

*Primary Examiner*—Robert L. Griffin
*Assistant Examiner*—Andrew J. Telesz, Jr.
*Attorney, Agent, or Firm*—Michael Ebert

[57] ABSTRACT

A fabric headband which incorporates a replaceable thermal cartridge and is integrated with a miniature radio set whereby when the band is worn about the head as a crown, it then provides beneficial thermal effects as the wearer listens to the radio through a pair of earphones which depend from the crown. The headband is constituted by a central pouch adapted to receive both the cartridge and a flexible card in front thereof having a metallized face, and a pair of hollow fabric wings extending from opposite ends of the pouch. When the band is encircled about the head and the wings are joined to define the crown, the cartridge in the pouch then lies in heat-exchange relationship with the brow of the wearer. Disposed in one wing is the miniature radio set in a flat format which is powered from a small battery pack disposed in the other wing, the antenna terminal of the radio being connected to the metallized face of the card which serves both as the antenna and as a back reflector for radiation emanating from the cartridge. Connected to the audio output of the set are a pair of flexible lines, one going out of one wing and terminating in one earphone, the other going out of the other wing and terminating in the other earphone.

5 Claims, 5 Drawing Figures

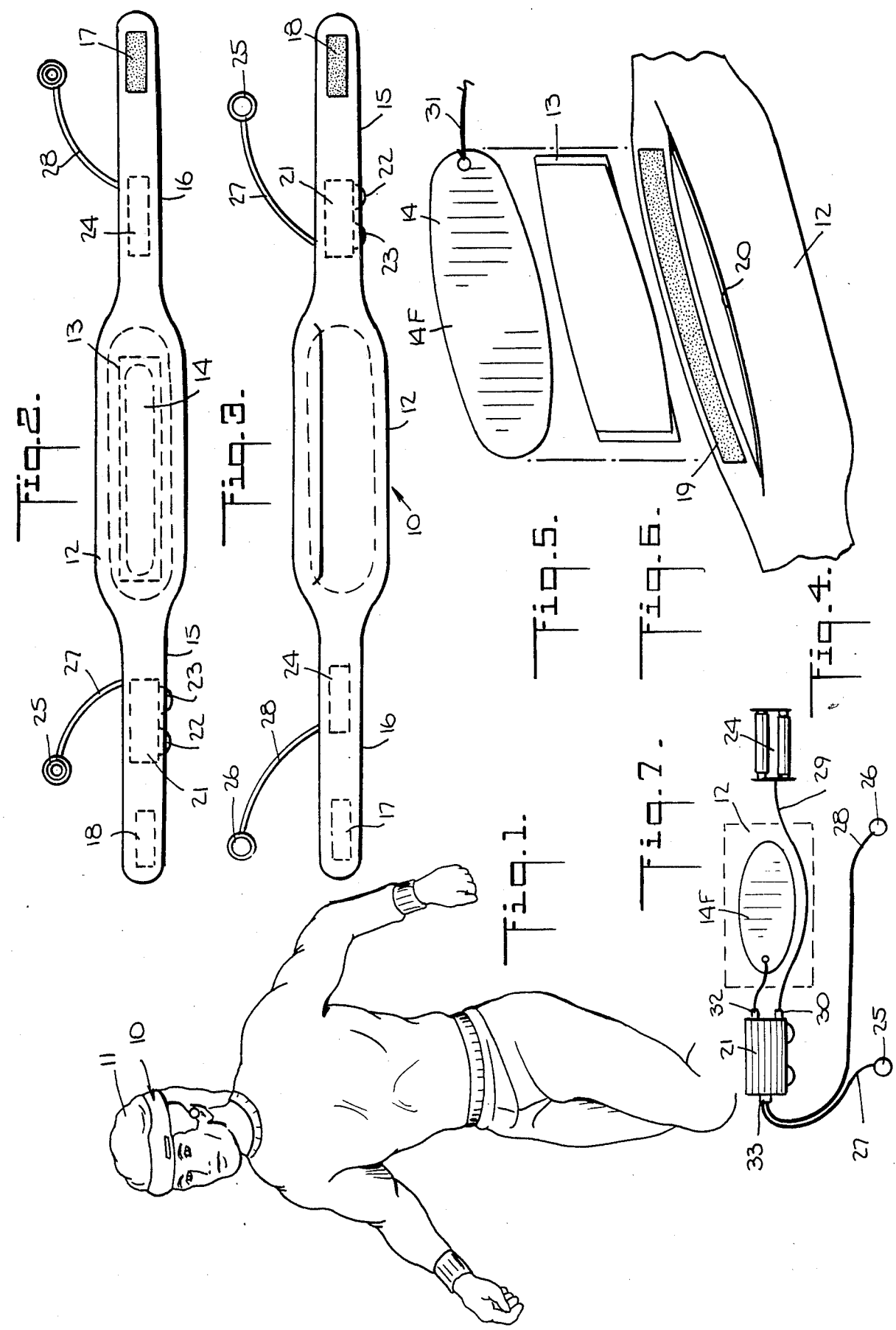

RADIO-THERMAL HEADBAND

BACKGROUND OF INVENTION

1. Field of Invention

This invention relates generally to portable radios, and more particularly to a miniature radio set integrated with a headband adapted to form a crown on the head of the wearer and incorporating a thermal cartridge that lies in heat exchange relationship with the brow of the wearer, a pair of earphones depending from opposing sides of the crown being plugged into the ears of the wearer whereby the listener to the radio also gains beneficial thermal effects.

2. Background of Invention

The modern transistor radio set, which is energized by a small battery, makes use of integrated circuit (IC) chips that include all of the transistors and the fixed capacitive and resistive components of the radio circuit. Because of IC chips, it is now possible to produce a miniature radio set which selectively operates either in the AM or FM band, the set being associated with headphones provided with an arched head clip.

The antenna for operation of the set in the AM band usually takes the form of a coil that is placed within the case. But this type of compact antenna is not workable in the very high-frequency FM band, and for this purpose an external wire antenna is required. The modern practice is to use one of the lines going to the external headphones as the FM antenna.

Of increasing popularity is the "Walkman" type of stereo FM portable radio made by the Sony Corporation and other companies in which the radio set is adapted to be clipped onto the waist belt of the wearer or to be placed in a breast pocket, with the stereo headphones placed on the head. Thus as the user walks in the street or ambles through a park, he can enjoy stereo broadcasts.

Where the user does not walk or is not passive, but engages in an athletic activity such as jogging or bicycling, then a "Walkman" type of radio creates a problem, for a compact radio set supported on a waist is a hindrance, and conventional headphones do not usually remain in place on the head of the exerciser.

SUMMARY OF INVENTION

In view of the foregoing, the main object of this invention is to provide an integrated circuit miniature FM stereo radio set for use by joggers and others engaged in athletic activity, the set being integrated with a fabric headband that can be encircled about the head of the wearer to form a secure crown thereon, a pair of earphones depending from the sides of the crown whereby they may be plugged into the ears and not dislodged.

More particularly, an object of this invention is to provide a headband of this type which also incorporates a replaceable thermal cartridge and a backing card therefor which has a metallized face that serves to reflect radiation emanating from the cartridge and also functions as the FM antenna for the radio set.

A significant advantage of the invention is that it not only supplies the wearer with music and other aural entertainment as he jogs or engages in any other athletic activity without interfering with this activity, but it also affords beneficial thermal effects appropriate to the environment, such as cooling or warming effects.

Briefly stated, these objects are attained in a fabric headband which incorporates a replaceable thermal cartridge and is integrated with a miniature radio set whereby when the band is worn about the head as a crown, it then provides beneficial thermal effects as the wearer listens to the radio through a pair of earphones which depend from the crown. The headband is constituted by a central pouch adapted to receive both the cartridge and a flexible card in front thereof having a metallized face, and a pair of hollow fabric wings extending from opposite ends of the pouch. When the band is encircled about the head and the wings are joined to define the crown, the cartridge in the pouch then lies in heat-exchange relationship with the brow of the wearer. Disposed in one wing is the miniature radio set in a flat format which is powered from a small battery pack disposed in the other wing, the antenna terminal of the radio being connected to the metallized face of the card which serves both as the antenna and as a back reflector for radiation emanating from the cartridge. Connected to the audio output of the set are a pair of flexible lines, one going out of one wing and terminating in one earphone, the other going out of the other wing and terminating in the other earphone.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a radio-thermal headband in accordance with the invention which is shown worn as a crown on the head of a wearer;

FIG. 2 is a front view of the headband;

FIG. 3 is a rear view of the headband;

FIG. 4 shows the pouch section of the headband in its open state;

FIG. 5 is a separate view of the backing card which is inserted into the pouch;

FIG. 6 is a separate view of the thermal cartridge which is inserted into the pouch; and FIG. 7 shows the electrical connections between the various components of the radio.

DESCRIPTION OF INVENTION

To a limited degree, one can accommodate the human body to widely different environmental conditions by appropriate clothing. Thus clothing providing good thermal insulation makes it possible for an individual to function effectively in severe cold; and by wearing light, well-ventilated clothing, one can be reasonably comfortable in a hot climate.

Clothing serves a heat exchange function; for it determines the propagation rate of heat from the body to the atmosphere. When ambient temperature is well below body temperature, clothing acts as thermal insulation to slow down the heat exchange rate and thereby reduce the loss of heat; and when ambient temperature is well above body temperature, the rate at which heat is lost from the body is enhanced by suitable clothing, particularly if it acts as a wick to disperse sweat over a broad area to promote evaporative cooling.

There are, however, many situations where regardless of the clothing worn, the clothing is incapable of maintaining the body temperature at an acceptable level. Thus athletes such as long-distance runners, tennis players and bicycle riders who exercise vigorously in a warm environment may be subject to heat prostration, for they are unable to dissipate sufficient heat to maintain a safe body temperature. Even in a relatively cool indoor environment, the athlete may sweat excessively, this giving rise to premature fatigue.

On the other hand, when an athlete exercises in a severely cold environment, the resultant increase in heat production may still be inadequate to overcome the rapid loss of heat from the body to the atmosphere, particularly when the nature of the activity is such that the athlete cannot be heavily bundled in warm clothing.

In order to provide a heat exchange system for personal use to effect beneficial cooling or warming for a prolonged period, it is known to provide a fabric headband which includes a pouch into which is insertable a replaceable thermal cartridge adapted to conform to the brow of the wearer, the cartridge functioning as a heat sink or a heat source, depending on how it is activated.

By an activated cartridge is meant a cartridge enclosing a liquid or gel mass having a high heat capacity, the cartridge having been preheated or refrigerated to cause the entire mass to assume an elevated or reduced temperature, whereby when the cartridge when in heat exchange relationship with the brow of the wearer, then functions to warm or cool the wearer for a prolonged period.

As shown in FIG. 1, a radio/thermal headband, generally designated by numeral 10, in accordance with the invention, is encircled about the head 11 of a wearer to create a crown whose front portion is pressed against the brow of the wearer. As seen in front view in FIG. 2, the headband which is formed of a woven or non-woven fabric, is constituted by a central pouch section 12 adapted to accommodate a cartridge 13 and a backing card 14. Extending from either wide of this section are hollow fabric wings 15 and 16.

The fabric material of the headband must be such as to minimize hot or cold shock by affording some degree of thermal isolation between the skin and the wearer and the thermal cartridge. At the same time, the fabric material must have good wicking properties so as to rapdily and efficiently absorb perspiration exuded from the skin and to disperse the absorbed perspiration over a broad area to promote evaporative cooling.

To this end, a textured fabric may be used having these characteristics, such as a terry cloth fabric or one having similar towel-like properties. A preferred material is the Kaiser-Roth "Super Wick" terry cloth, a composite fabric consisting of 65% Orlon, 25% cotton and 25% Nylon. This material is exceptionally wickable and yet has good thermal insulating orperties, serving to keep the activated thermal cartridge hot or cold, as the case may be, for a prolonged period.

The thermal cartridge 13 received in pouch section 12 is constituted by a heat-sealed rectangular envelope of synthetic thermoplastic film material such as polyvinyl chloride, polypropylene or a polyester. A preferred polyester is "Mylar" which is flexible as well as tear and puncture resistant. The cartridge is filled with a liquid or gel having a high heat capacity. The gel may be of the type disclosed in the Spencer U.S. Pat. No. 3,885,403, which is constituted by a mixture of water, a freezing point depressant, such as glycerine or propylene glycol, and a suitable thickening agent. Also, a fungistat may be added to inhibit fungus growth.

Secured to the rear of right wing 16 is a strip 17 forming one component (female or male) of a "Velcro" type fabric fastener, and secured to the front of left wing 16 is a strip 18 forming the complementary component of this fastener. "Velcro" fasteners are constituted by an array of hook-shaped nylon male elements which engage an array of female loops when the components are pressed together. Hence, when the headband encircles the head, the wing ends which are then at the rear of the head, overlap and are pressed together to join the "Velcro" components. Because the fastener components are in strip form, the fastener is self-adjusting to heads of different size.

Pouch 12, as best seen in FIG. 4, is provided with an elongated opening having "Velcro" components 19 and 20 acting as a closure therefor, so that one may readily insert or remove the cartridge and its backing card.

Sewed or otherwise secured within hollow wing 15 is a miniature transistor radio set 21 in a flat, ultra-thin format of the type made possible by the use of IC chips. By the use of flexible plastic dielectric film serving as printed circuit connectors, the set may be made in articulated flat sections, so as to conform to the contour of the head. The radio set is provided with an "on-off" disc-shaped volume control knob 22 which projects from the lower edge of the casing an an adjacent tuning control knob 23. These knobs project through slots in the lower edge of wing 15 to provide access thereto by an operator. Alternatively, the control knob may be arranged to come out of the front face of the wing.

Disposed within the other wing 16 is a thin battery pack 24 containing a pair of miniature dry cells providing a 3 volt d-c supply, or a single cell providing a 7 volt supply, depending on the power requirements of the radio. The invention is not limited to any particular embodiment of an FM stereo radio, and any existing type may be used as long as it lends itself to an ultra-thin IC format.

Associated with the radio set is a pair of earphones 25 and 26 of the type that can be plugged into the ear rather than clamped thereagainst by an arched headband as in the headphones. The earphones may be provided with a small, curved clip that goes behind the earlobe to provide a more secure mounting therefor. Earphone 25 is at the end of a flexible cable or line 27 which goes into wing 15 and is connected to one channel of the stereo output of the radio so that this earphone is suspended loosely from wing 15. Earphone 26 is at the end of a second flexible line 28 that goes through wing 16 and is connected to the other stereo channel of the radio output, so that the earphone is suspended from wing 16.

Card 14, which has an oval form to more or less conform to the geometry of the pouch section is made of flexible cardboard material. Laminated to the face of the card is a metallized ply 14F of aluminum foil or similar material. The card which is placed in front of the cartridge acts, because of its metallized ply, to reflect radiant energy emitted from the cartridge, thereby minimizing thermal energy leakage. When the crown is in place, the rear side of the cartridge is in heat exchange relationship with the brow of the wearer, and the card on the front side of the cartridge acts as an infrared and ultraviolet radiation barrier.

The various interconnections of the components are shown in FIG. 7, where it will be seen that battery pack 24 is connected by a line 29 running through pouch 12 of the headband and terminating in a plug 30 that is inserted into the battery input socket of radio set 21. The reflective face 14F of the card which also acts as the FM antenna for the radio, is connected by a line 31 to a plug 32 which goes into an external-antenna socket on the radio.

In practice, the metallized planar surface on the face of card 10 may be given an antenna dipole or other antenna configuration so as to provide a more efficient antenna resonant to the FM band. Earphones 25 and 26 are connected by lines 27 and 28 to a plug 33 inserted in the stereo audio-output socket of the set.

Though the use of a thermal cartridge is useful in converting the headband into a heat transfer device for warming or cooling the user, it may in some cases be dispensed with; for if the wearer simply wishes to listen to a radio as he walks or carries out any other activity without having the radio interfere with this activity, he may wear the headband without the cartridge.

While there has been shown and described a preferred embodiment of a radio-thermal headband in accordance with the invention, it will be appreciated that many changes and modifications may be made therein without, however, departing from the essential spirit thereof. Thus, instead of a "Velcro" fastener, one may provide a buckle and strap arrangement or a short elastic band which joins the opposing wings of the headband. And instead of a metallized card, one may provide an FM antenna wire in the pouch section.

I claim:

1. A flexible radio headband for personal use by a wearer, said headband comprising:
   A. a central pouch section from which hollow wings extend on either side thereof, each wing being provided with fastening elements whereby the headband may be encircled about the head of a wearer to form a crown in which the pouch section is pressed against the brow of the wearer and the wings run along the sides and rear of the head;
   B. a flexible card having a metallized face housed in said pouch section and functioning as an antenna;
   C. a battery-powered transistor radio set in a flat format disposed within one of said wings and connected to said metallized face of the card in said pouch; said radio having an audio output; and
   D. a pair of earphones, one of which is connected by a flexible line passing through said one wing for connection to the audio output of the radio, whereby said earphone is supended from this wing and is pluggable into one ear of the wearer, the other earphone being similarly connected to the audio output by a flexible line passing through the other wing where it may be plugged into the other ear.

2. A headband as set forth in claim 1, wherein said set is an FM stereo set having two channels and said earphones are connected to the respective channels.

3. A headband as set forth in claim 1, wherein said headband is fabricated of a moisture-absorbent fabric material.

4. A headband as set forth in claim 1, wherein the batteries for said set are held in a power pack disposed in the other wing and connected to said set by wires running through the pouch section.

5. A headband as set forth in claim 1, further including a flexible thermal, activatable cartridge in a flat format which is filled with a liquid or gel having a high heat capacity housed in said pouch section behind said card therein in heat exchange relationship with the brow of the wearer, the metallized face of the card also functioning as a radiation reflector for the cartridge.

* * * * *